United States Patent [19]

Hoffmann et al.

[11] Patent Number: 4,526,268
[45] Date of Patent: Jul. 2, 1985

[54] APPARATUS FOR ASSEMBLING ARRAYS OF CIGARETTES OR THE LIKE

[75] Inventors: Gottfried Hoffmann, Schwarzenbek; Reinhard Deutsch, Geesthacht; Klaus-Jürgen Pohl, Hamburg, all of Fed. Rep. of Germany

[73] Assignee: Hauni-Werke Körber & Co. KG., Hamburg, Fed. Rep. of Germany

[21] Appl. No.: 470,569

[22] Filed: Feb. 28, 1983

[30] Foreign Application Priority Data

Mar. 5, 1982 [DE] Fed. Rep. of Germany ....... 3207954

[51] Int. Cl.³ ............................................. B65G 47/26
[52] U.S. Cl. .................................... 198/419; 198/420; 198/653; 414/63; 53/150; 53/151; 53/236
[58] Field of Search ............... 198/418, 419, 420, 653; 53/148, 149, 150, 151, 236; 131/282, 283; 271/220; 414/63

[56] References Cited

U.S. PATENT DOCUMENTS

| | | | |
|---|---|---|---|
| 2,683,557 | 7/1954 | Jenney | 198/419 X |
| 2,853,177 | 9/1958 | Engleson et al. | 53/150 X |
| 3,123,959 | 3/1964 | Carriere et al. | 53/150 |
| 3,435,940 | 4/1969 | Seragnoli | 198/419 |
| 3,520,394 | 7/1970 | Seragnoli | 198/419 |
| 3,599,396 | 8/1971 | Schmermund | 198/419 X |
| 3,642,112 | 2/1972 | Seragnoli | 198/419 |
| 4,306,648 | 12/1981 | Manservisi et al. | 198/419 |
| 4,341,298 | 7/1982 | Dingli | 198/419 |
| 4,362,235 | 12/1982 | Erdmann | 198/419 |
| 4,364,464 | 12/1982 | Manservisi et al. | 198/419 |

FOREIGN PATENT DOCUMENTS 2243911 3/1974 Fed. Rep. of Germany ........ 53/150

Primary Examiner—Joseph E. Valenza
Assistant Examiner—Jonathan D. Holmes
Attorney, Agent, or Firm—Peter K. Kontler

[57] ABSTRACT

Apparatus for assembling multi-layer blocks of parallel cigarettes has a magazine with several outlets having narrow elongated horizontal openings for the discharge of successive layers of cigarettes. An endless conveyor transports a succession of variable-volume receptacles stepwise along a path a horizontal portion of which extends along the outlets so that the opening of each outlet registers with a receptacle when the conveyor is arrested. The volumes of the receptacles are varied by a system of cams, which act upon movable top walls of the receptacles, in such a way that the volumes of the receptacles exceed the space requirements of the layer or layers therein only while the conveyor is idle, i.e., while the receptacles in register with the openings of the outlets are about to receive and are in the process of receiving layers of cigarettes; during each stage of movement of the conveyor, each receptacle which contains one or more layers of cigarettes is filled to capacity because the system of cams ensures that the movable top wall of each such receptacle is held as close to the nearest layer of cigarettes as is necessary to prevent any misalignment of cigarettes in the receptacles due to rapid acceleration or deceleration and/or abrupt starting or stoppage of the conveyor.

13 Claims, 4 Drawing Figures

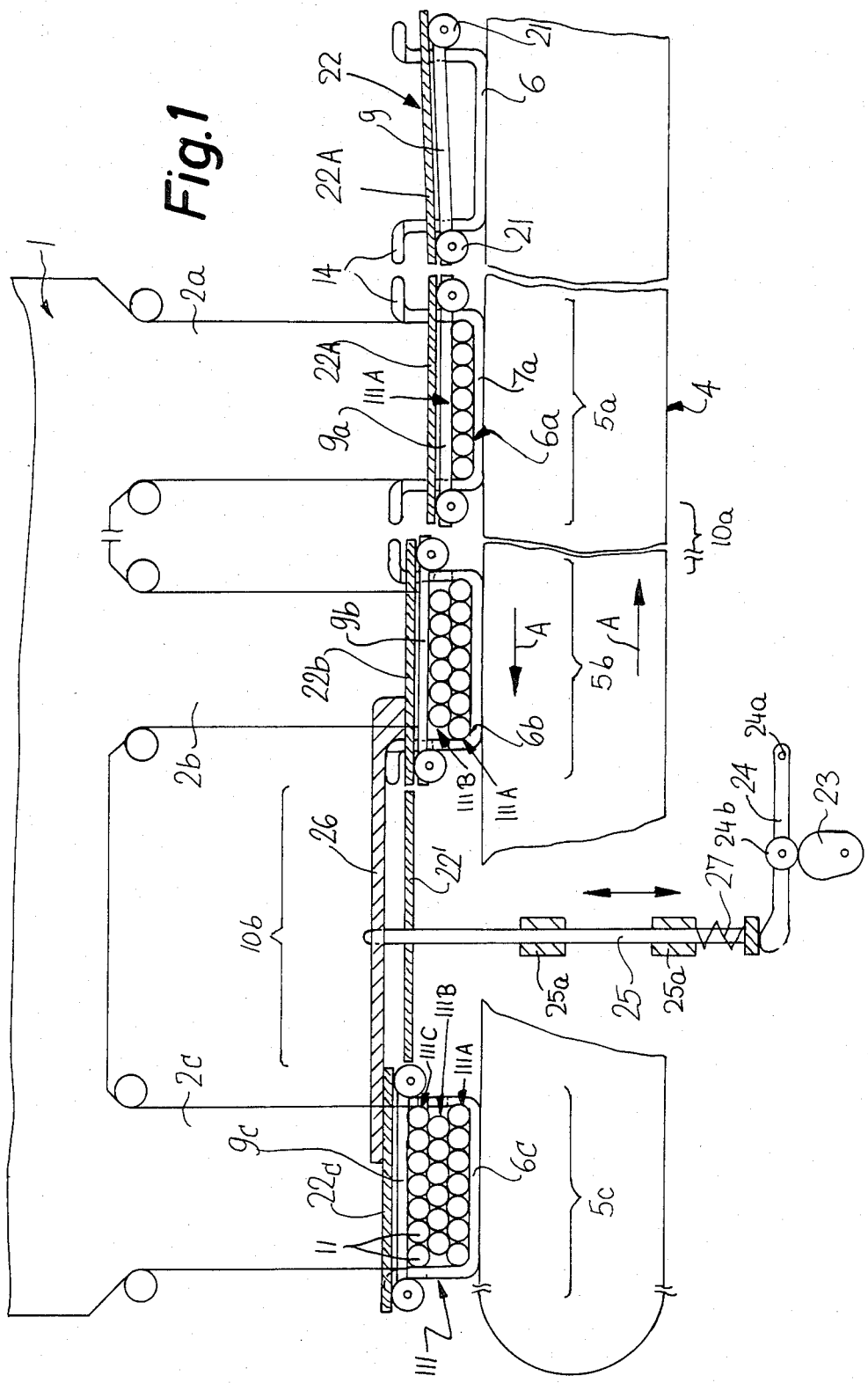

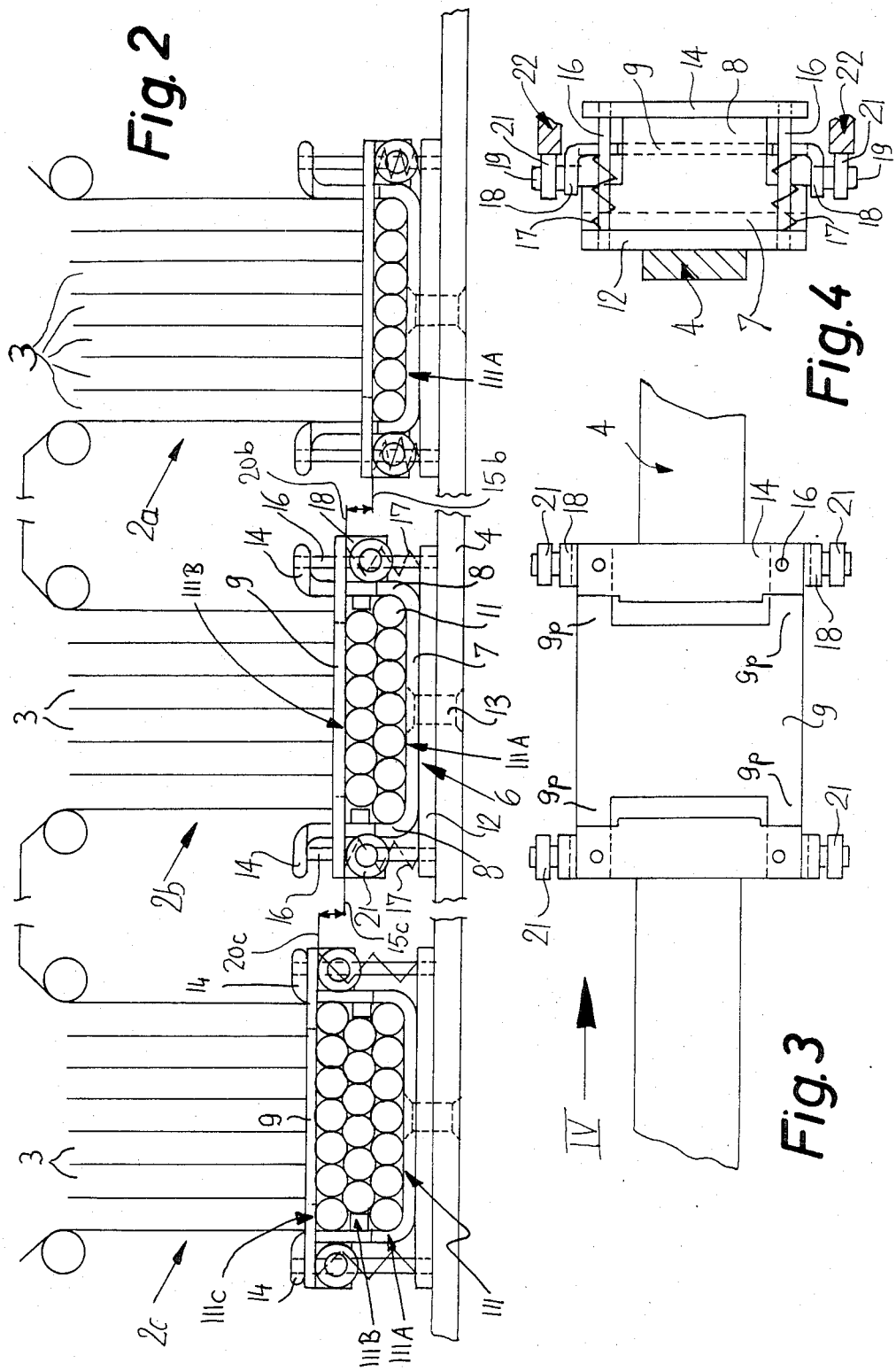

APPARATUS FOR ASSEMBLING ARRAYS OF CIGARETTES OR THE LIKE

BACKGROUND OF THE INVENTION

The present invention relates to apparatus for assembling arrays of rod-shaped articles, especially plain or filter cigarettes, cigars or cigarillos. More particularly, the invention relates to improvements in apparatus of the type wherein successive layers of multi-layer arrays of parallel rod-shaped articles are transferred into successive receptacles of a conveyor which is caused to advance along a source of supply of such articles, for example, along the magazine of a cigarette packing machine. Still more particularly, the invention relates to improvements in apparatus of the type wherein each of several spaced-apart components of a magazine gathers successive layers of parallel rod-shaped articles for introduction into successive receptacles of an intermittently driven conveyor.

Commonly owned U.S. Pat. No. 4,362,235 granted Dec. 7, 1982 to Erdmann, and commonly owned pending U.S. patent application Ser. No. 421,561 filed Sept. 22, 1982 by Erdmann et al., disclose apparatus which can accumulate rod-shaped smokers' products (hereinafter called cigarettes for short) into arrays in the form of blocks wherein several layers of parallel cigarettes are disposed in parallel planes and the cigarettes of neighboring layers are preferably staggered relative to one another to constitute formations which are customary in 20-cigarette packs. The magazines of apparatus which are disclosed in the aforementioned patent and patent application have several upright outlets each of which contains several ducts for the accumulation of successive layers of cigarettes at different levels. Reciprocable pushers are employed to transfer successively formed layers into the receptacles of an intermittently driven conveyor which is at a standstill during each transfer of layers and is thereupon set in motion to rapidly advance successive receptacles from the preceding to the next-following outlets. The accumulation of blocks of cigarettes from discrete layers in lieu of simultaneous introduction of entire blocks into successive receptacles is preferred in modern high-speed packing machines because the gathering of a single layer of cigarettes takes up a small fraction of the time which is needed to accumulate an entire block at a single outlet of the magazine. The just discussed mode of accumulating multi-layer blocks constributes to a very pronounced reduction of intervals of time which are needed to accumulate blocks of articles in accordance with previously known techniques, e.g., in a manner as disclosed in commonly owned U.S. Pat. No. 4,061,234 granted Dec. 6, 1977 to Bantien et al. This patent teaches to assemble several layers of cigarettes into a complete block while the receptacle which is about to receive the block is in the process of advancing to the block forming station.

However, heretofore known apparatus for accumulation of blocks of cigarettes in the form of multi-layer arrays, wherein each layer is introduced at a separate station, also exhibit certain drawbacks, especially in modern high-speed cigarette packing and like machines. The drawbacks are attributable to the need for the rapid acceleration and rapid deceleration during successive periods of dwell of the conveyor in order to reduce to a minimum the intervals of transport of receptacles from station to station. The cigarettes of the layers are transported sideways and are highly likely to become misaligned, for example, to lie askew, especially in those receptacles which are not filled to capacity, i.e., in each receptacle which does not confine a full block or array of cigarettes (e.g., a block of twenty cigarettes consisting of two outer layers having seven cigarettes each and a median layer of six cigarettes). Any shifting of the cigarettes in the receptacles of the intermittently driven conveyor entails the accumulation of arrays which are not suited for introduction into packets and must be discarded with attendant losses in output of the packing machine and considerable expenditures for recycling of acceptable cigarettes and recovery of tobacco from damaged cigarettes. Undesirable shifting of cigarettes cannot be reliably avoided by the already proposed expedient of employing receptacles which are so narrow that the lowermost and uppermost layers of cigarettes extend all the way between the side walls of the respective receptacle and the cigarettes of the median layer extend into the recesses between the cigarettes of the outer layers (it is assumed here that the cigarettes are assembled into arrays of twenty cigarettes each). In order to avoid any, even remote, likelihood of misalignment of cigarettes, it is necessary to drive the conveyor at less than optimum speed (i.e., to operate the packing machine at less than capacity) and/or to resort to complex and costly devices which hold the cigarettes against shifting prior to complete filling of the respective receptacles. Such devices are installed externally of the receptacles and are intended to guide those portions of cigarettes which extend beyond their receptacles.

OBJECTS AND SUMMARY OF THE INVENTION

An object of the invention is to provide a novel and improved apparatus which can accumulate multi-layer arrays of parallel rod-shaped articles in stepwise fashion, one layer at a time, without the danger of misalignment of articles prior to completion of the arrays, even if the conveyor which tranports the receptacles for the articles is subjected to repeated abrupt acceleration and deceleration.

Another object of the invention is to provide a novel and improved conveyor for use in the above outlined apparatus.

A further object of the invention is to provide the conveyor with novel and improved receptacles for accumulation of multi-layer arrays of rod-shaped articles at several successive stations.

An additional object of the invention is to provide an apparatus wherein the articles forming the individual layers of successive arrays are unlikely to change their positions prior or subsequent to completed accumulation of arrays.

Another object of the invention is to provide the apparatus with novel and improved means for varying the capacity of receptacles which accumulate successive multi-layer arrays of rod-shaped articles, especially cigarettes or like smokers' products, in a packing or like processing machine.

A further object of the invention is to provide an arraying apparatus which can be installed in existing cigarette packing or analogous machines as a superior substitute for heretofore known apparatus.

Another object of the invention is to provide a novel and improved method of accumulating multi-layer arrays of cigarettes or the like in a plurality of successive stages.

An additional object of the invention is to provide an apparatus which treats the articles gently, which is compact and relatively inexpensive, and which can accumulate arrays of cigarettes or the like at the same rate of speed as, or even faster than, heretofore known apparatus.

Still another object of the invention is to provide the apparatus with novel and improved means for preventing the rod-shaped articles of individual layers from changing their orientation during transfer into the receptacles of the conveyor as well as during transport with the receptacles toward and beyond the station where the accumulation of successive arrays is completed.

Another object of the invention is to provide an apparatus which produces fewer rejects than conventional apparatus even though it can accumulate arrays at a rate matching that which is required to satisfy the requirements of modern high-speed cigarette packing or like machines.

One feature of the invention resides in the provision of a method of gathering successive arrays of superimposed layers of parallel rod-shaped articles, especially articles which constitute or form part of smokers' products, in a series of variable-volume receptacles. The method comprises the steps of cyclically advancing each of a preferably endless series of variable-volume receptacles to a first station, introducing a first layer of articles into the receptacle at the first station, advancing the thus partially filled receptacle from the first station to a second station and simultaneously maintaining the volume of the partially filled receptacle at a value which is just sufficient to accommodate the first layer so that the articles of the first layer cannot become misaligned during transport from the first to the second station, increasing the volume of the partially filled receptacle at the second station to provide room for a second layer, introducing the second layer into the receptacle at the second station, advancing the receptacle with the two layers therein beyond the second station, and simultaneously maintaining the volume of the receptacle at a value which is just sufficient to accommodate the first and second layers so that the receptacle leaving the second station prevents misalignment of articles which form the first and second layers therein.

Another feature of the invention resides in the provision of an apparatus for assembling arrays (e.g., blocks) of overlapping layers of parallel cigarettes or analogous rod-shaped articles. The apparatus comprises a conveyor which is movable intermittently in a predetermined direction along a predetermined path and includes a plurality of equidistant variable-capacity receptacles for arrays, a magazine which is adjacent to a portion of the path and includes several outlets each having means for accumulating successive layers of parallel articles and an opening for evacuation of successively accumulated layers, each opening being in register with a receptacle during each interval of dwell of the conveyor, pushers or other suitable means for transferring layers of articles from the outlets of the magazine into the registering receptacles during successive intervals of dwell of the conveyor, and means for varying the volumes of the receptacles so that each receptacle which registers with an opening provides room only for reception of the respective layer and especially that the receptacles advancing between and beyond the openings are at least substantially filled to capacity. The spacing between the openings of the outlets matches the spacing between the receptacles of the conveyor, as considered in the direction of travel of the receptacles, and the width of each opening, again as considered in the direction of travel of the receptacles, matches or closely approximates the width of layers which are accumulated in the respective outlets.

In accordance with a feature of the invention, each receptacle includes at least one movable wall and the aforementioned varying means includes means for moving the movable walls of the receptacles between different positions to thereby vary the volumes of the respective receptacles. Each receptacle further comprises a second wall which is at least substantially parallel to the movable wall, and the moving means includes means for moving the movable wall substantially at right angles to the second wall. Each receptacle preferably further comprises a pair of side walls, and the movable walls preferably include portions which extend outwardly beyond the respective side walls. Each receptacle further comprises guide means for the aforementioned outwardly extending portions of the respective movable walls. The moving means preferably includes springs or analogous means for yieldably urging the movable walls away from the respective second walls.

The outlets of the magazine (the latter can form part of a cigarette packing machine) include a first outlet and a second outlet which is located downstream of the first outlet, as considered in the direction of travel of the receptacles. The moving means preferably includes means for maintaining the movable walls of receptacles approaching the first and second outlets in first positions at a first distance from the respective second walls and for moving the movable wall of the receptacle which is in register with the opening of the second outlet to a second position at a greater second distance from the respective second wall during each interval of dwell of the conveyor. This ensures that the receptacles approaching the first and second outlets provide room only for a single layer of articles and that the volume of the receptacle in register with the opening of the second outlet is increased to provide room for a second layer of articles. In other words, the distance between the movable wall and the second wall of the receptacle which is in register with the opening of the first outlet at least approximates the thickness of a single layer of articles whereas the distance between the movable wall and the second wall of the receptacle which is in register with the opening of the second outlet in the second position of the movable wall at least approximates the combined thickness of two layers (such distance can be somewhat less than the combined thickness of two layers if the articles of one layer are caused or allowed to enter the recesses between neighboring articles of the other layer).

The moving means preferably comprises cam means which is adjacent to the path of movement of the receptacles, and the movable walls then include or are provided with follower means tracking the cam means. The aforementioned spring means can be mounted on the aforementioned guide means to bias the follower means of the movable walls against the cam means. The cam means can include a fixed section extending along the first outlet and between the first and second outlets of the magazine, a movable section which is adjacent to the second outlet, and means (e.g., including additional cam means) for reciprocating the movable section of the cam means between a position of at least substantial alignment with the fixed section and a second position in which the distance between the movable wall of the receptacle which is in register with the opening of the second outlet and the respective second wall is greater than that between the movable wall and the second wall of the receptacle which is in register with the opening of the first outlet.

The outlets can include a third outlet which is located downstream of the second outlet, as considered in the direction of travel of receptacles, and the cam means then further comprises a second fixed section installed between the second and third outlets to maintain the movable walls of successive receptacles at a distance from the respective second walls which corresponds to the aforementioned greater distance, a second movable cam section at the third outlet, and means for reciprocating the second movable cam section between a position of at least substantial alignment with the second fixed cam section and a second position in which the distance between a movable wall which is adjacent to the second movable cam section and the respective second wall exceeds the aforementioned greater distance.

The openings of the outlets are preferably disposed at different levels. The apparatus further comprises means for expelling fully assembled arrays of articles from the receptacles downstream of the last outlet, as considered in the direction of travel of the receptacles. The openings are or can be at least substantially horizontal, and the aforementioned accumulating means can comprise upright ducts in the outlets.

If the apparatus is to accumulate arrays wherein one or more layers are staggered sideways with reference to the other layer or layers, at least one of the outlets can be arranged to accumulate successive layers each of which contains a first number of parallel articles, and at least one other outlet is arranged to accumulate layers each of which contains a different second number of parallel articles. This is desirable if the apparatus is to accumulate blocks of twenty cigarettes each wherein each block contains two outer layers of seven cigarettes each and a median layer which consists of six parallel cigarettes.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic longitudinal vertical sectional view of an apparatus which embodies the present invention and is designed to accumulate arrays of twenty cigarettes each;

FIG. 2 is an enlarged fragmentary front elevational view of the apparatus;

FIG. 3 is a plan view of a receptacle of the conveyor in the apparatu,s of FIG. 1; and FIG. 4 is a view substantially as seen in the direction of arrow IV in FIG. 3.

DESCRIPTION OF THE PREFERRED EMBODIMENTS

Referring first to FIG. 1, there is shown an apparatus which can accumulate arrays 111 of rod-shaped articles 11 (e.g., filter cigarettes) so that each array 111 constitutes a block which contains twenty parallel articles 11 in quincunx formation. A full array or block 111 is shown in the left-hand portion of FIG. 1; this block comprises a lowermost layer 111A consisting of seven closely adjacent parallel articles 11, a median layer 111B consisting of six closely adjacent parallel articles 11, and a topmost layer 111C consisting of seven closely adjacent parallel articles 11. The articles 11 of the median layer 111B are staggered with respect to the articles 11 of the two outer layers 111A and 111B. The block 111 is ready to be introduced into a mandrel in a cigarette packing machine, e.g., in a packing machine of the type disclosed in commonly owned U.S. Pat. No. 3,750,676 granted Aug. 7, 1973 to Kruse et al. The disclosure of this patent, as well as of each other patent and/or application mentioned herein, is incorporated by reference. A modified cigarette packing machine which can process the blocks 111 is disclosed in commonly owned U.S. Pat. No. 3,956,870 to Kruse et al.

The apparatus comprises a magazine 1 which forms part of the packing machine and contains a substantial supply of parallel articles 11. The magazine 1 comprises three vertically downwardly extending outlets 2a, 2b, 2c with the median outlet 2b equally spaced from the outlets 2a and 2c. As shown in FIG. 2, each of the outlets 2a, 2c has seven parallel upright layer-accumulating ducts 3, and the median outlet 2b has six parallel upright ducts 3. The ducts 3 receive articles from the upper part of the magazine 1 by gravity flow, and each of these ducts contains a column of parallel horizontal articles 11 with the lowermost articles forming a layer 111A, 111B or 111C, depending on the outlet. As shown in FIG. 2, the fully assembled layer 111A in the lowermost part of the outlet 2a is disposed at a level below the layer 111B in the lowermost part of the outlet 2b, and the just mentioned layer 111B is disposed at a level below that of the layer 111C in the lowermost part of the outlet 2c. The manner in which the layers 111A, 111B, 111C in the outlets 2a-c of the magazine 1 are held at different levels is fully disclosed and shown in the aforementioned commonly owned U.S. Pat. No. 4,362,235 to Erdmann. This patent also discloses and shows transfer elements in the form of reciprocable pushers which are also used in the apparatus of the present invention to expel the fully assembled layers 111A, 111B, 111C from the lowermost portions of the respective ducts 2a, 2b and 2c. To this end, the front and rear walls of the ducts 2a to 2c have narrow elongated horizontal openings (shown in the '235 patent to Erdmann) which allow the pushers to enter from behind and to expel the respective layers 111A, 11B, 11C forwardly toward the observer of FIG. 1 or 2. The pushers are caused to perform forward and return strokes at predetermined intervals in synchronism with movements of an endless chain or belt conveyor 4 which carries a series of equidistant variable-volume receptacles or cells four of which are shown in FIG. 1, as at 6, 6a, 6b and 6c. The levels of the openings in the lowermost parts of the ducts 2a, 2b, 2c of the magazine 1 are selected in such a way that a cell (see the cell 6b in FIG. 1) which has received a layer 111A of seven articles 11 at the station 5a accommodating the outlet 2a can receive a layer 111B of six cigarettes without any interference on the part of the already introduced and confined layer 111A, and that a cell (note the cell 6c at the station 5c accommodating the outlet 2c of the magazine 1) which already contains a layer 111A and a layer 111B can receive a layer 111C without any interference on the part of the layer 111B. The manner in which the conveyor 4 is intermittently driven through increments such that successive cells 6, 6a, 6b, 6c . . . advance from station to station (e.g., by a geneva movement) is not specifically shown in the drawing. It suffices to say that a fresh cell is located at each of the three stations 5a, 5b, 5c during each interval of dwell of the conveyor 4. These stations respectively register with the lower portions of the outlets 2a, 2b and 2c forming part of the magazine 1.

The construction of the cells is shown in detail in FIGS. 2, 3 and 4. Each of these cells comprises a bottom wall (second wall) 7 which is horizontal while the respective cell travels with the upper reach of the conveyor 4 (because the aforementioned openings in the lowermost portions of the outlets 2a–2c are assumed to be disposed in horizontal planes), a top wall 9 which is parallel to and is movable toward and away from the respective bottom wall 7, two side walls 8 which cooperate with the walls 7, 9 to define a compartment of variable height (namely, a compartment whose height suffices to accommodate a layer 111A, a pair of layers 111A, 111B or three layers 111A, 111B and 111C), and guide means for ensuring that the top wall 9 remains parallel with the respective bottom wall 7 in each of its several positions as regards its distance from the bottom wall.

Each bottom wall 7 is mounted on a base plate 12 and is secured to the respective section or link of the conveyor 4, e.g., by one or more rivets 13 or analogous fasteners. The side walls 8 have slots for the respective outwardly extending portions $9_p$ of the top wall 9, and such portions $9_p$ are slidable along parallel guide pins 16 extending at right angles to the plane of the bottom wall 7. The guide pins 16 are mounted in the respective base plate 12 as well as in outwardly bent marginal ledges 14 of the respective side walls 8. As can be seen in FIG. 3, each of the movable top walls 9 is guided by four pins 16. FIG. 2 shows coil springs 17 which surround the guide pins 16 and react against the respective base plate 12 to yieldably urge the top wall 9 to its uppermost position, i.e., to a position at a maximum distance from the respective bottom wall 7. As shown in the left-hand portion of FIG. 2, the top wall 9 abuts against the undersides of the ledges 14 in its topmost position in which the compartment between the walls 7 and 9 accommodates a complete block 111 consisting of three layers (111A, 111B, 111C) of parallel articles 11.

At each of its four corners, the mobile wall 9 is formed with a lug 18 which is bent through 90° and is located outside of the respective compartment for the layers of cigarettes. Each such lug 18 carries a shaft 19 for an idler roller 21 constituting a roller follower adapted to track the sections of a composite cam 22 which forms part of a means for varying the distance between the walls 7, 9 of the cells 6 and allows the top wall 9 to rise under the action of the springs 17 or causes the wall 9 to descend against the opposition of such springs during predetermined stages of movement of the respective cell 6 along an endless path which is defined by the conveyor 4. The walls 7 and 9 are parallel to the elongated openings in the lowermost portions of the outlets 2a to 2c of the magazine 1.

The cam 22 includes fixed or stationary sections 22A, 22' upstream of the outlet 2b and between the outlets 2b, 2c of the magazine 1. Those sections (22b and 22c) of the cam 22 which are disposed in the regions of the outlets 2b and 2c (i.e., at the stations 5b and 5c) are movable up and down between different levels. The fixed section 22' of the cam 22 is disposed between the movable sections 22b, 22c, i.e., the section 22' extends between the stations 5b, 5c. The sections 22b and 22c are movable up and down by an intermittently driven disc cam 23 through the medium of a lever 24 which is pivotable at 24a and has a roller follower 24b for the peripheral cam face of the cam 23. The free end portion of the lever 24 bears against the underside of a vertically movable rod 25 which is reciprocable in bearings 25a and is biased downwardly by a coil spring 27. The upper end portion of the rod 25 is connected with a horizontal carrier 26 for the movable cam sections 22b and 22c. The throw of the cam 23 is such that (in combination with the spring 27) it can effect a movement of the cam sections 22b, 22c between lower end positions 15b, 15c and upper end positions 20b, 20c.

When the apparatus of the present invention is in use, the conveyor 4 intermittently transports the cells 6, 6a . . . in the direction indicated by the arrows A. As mentioned above, the length of each step suffices to ensure that a given cell (e.g., the cell 6 of FIG. 1) moves to the first station 5a (into register with the lower portion of the outlet 2a), thereupon to the second station 5b (into register with the lower portion of the outlet 2b), then to the third station 5c (into register with the lower portion of the outlet 2c ) and thereafter to an ejecting station (not shown in the drawing) which is located to the left of the station 5c and where the fully assembled block 111 is expelled from its cell to enter the next conveyor of the packing machine. Reference may be had to the aforementioned commonly owned patents to Kruse et al. The expulsion of fully assembled blocks 111 can be effected by a further pusher which is moved in synchronism with the pushers serving to expel layers 111A, 111B, 111C from the lowermost portions of the respective outlets 2a to 2c. The spacing between the stations 5a and 5b (shown at 10a) at least equals the length of a cell (as considered in the direction of arrows A), and the spacing 10b between the stations 5b, 5c also equals or exceeds the length of a cell. This ensures that the cam sections 22b, 22c can be lowered to the levels 15b, 15c prior to arrival of a cell at the station 5b or 5c.

FIG. 1 shows the parts of the improved apparatus in positions they assume immediately after simultaneous transfer of three layers 111A, 111B, 111C into the compartments of the registering cells 6a, 6b and 6c, respectively. The conveyor 4 is at a standstill and the pushers which have transferred the layers 111A to 111C at the respective stations 5a to 5c are immediately retracted so as to allow for accumulation of fresh layers 111A to 111C in the lowermost portions of the respective outlets 2a to 2c. The fixed section 22A of the cam 22 maintains the movable wall 9a of the cell 6a at the station 5a at a level such that the height of the compartment between the walls 7a and 9a just suffices to accommodate the layer 111A which rests on the upper side of the wall 7a. Thus, the articles 11 of the layer 111A cannot lie askew but must remain parallel to one another because the width of the space between the side walls 8 of the cell 6a is just sufficient to accommodate the layer 111A between the lowermost portions of such side walls. The fixed cam section 22A engages the followers 21 of the wall 9a and maintains the wall 9a at the illustrated level against the opposition of the respective coil springs 17 which then store energy and tend to lift the wall 9a as soon as permitted by the cam 22. The section 22A of the cam 22 extends across the space 10a between the stations 5a, 5b and all the way or very close to the right-hand side of the outlet 2b, as viewed in FIG. 1.

The movable walls 9b and 9c of the cells 6b, 6c at the stations 5b and 5c are held in the illustrated positions (i.e., at the illustrated levels) by the corresponding vertically movable cam sections 22b, 22c which are then respectively maintained in their upper positions 20b, 20c. Therefore, the compartment of the cell 6b can barely accommodate the layers 111A, 111B, and the compartment of the cell 6c can barely accommodate the fully assembled block 111 (layers 111A, 111B, 111C), i.e., the articles 11 in the cells 6b and 6c are held against any uncontrolled movements and remain parallel to one another irrespective of the abruptness of starting, arresting, accelerating and/or decelerating the conveyor 4.

The conveyor 4 is then set in motion so that the empty cell 6 reaches the station 5a, the cell 6a (with the layer 111A therein) reaches the station 5b, the cell 6b (with the layers 111A, 111B therein) reaches the station 5c, and the cell 6c (with the block 111 therein) reaches the aforementioned expelling station where the fully assembled block 111 is transferred into or onto a next conveyor of the packing machine. The just mentioned movement of the conveyor 4 involves a transport of the cell 6a across the space 10a between the stations 5a, 5b and a transport of the cell 6b across the space 10b between the stations 5b and 5c. The fixed cam section 22A extends all the way to the outlet 2b and ensures that the articles 11 of the layer 111A in the cell 6a cannot change their positions relative to the walls of the cell 6a regardless of the extent and/or abruptness of acceleration or deceleration of the conveyor 4. Analogously, the stationary cam section 22' between the stations 5b and 5c constitutes an extension of the movable cam section 22b (in the raised position 20b of the section 22b) and ensures that the layers 111A, 111B of articles 11 in the cell 6b cannot change their positions during movement of the cell 6b across the space 10b, i.e., from the station 5b to the station 5c.

While the cells 6a and 6b respectively move in the spaces 10a and 10b, the prime mover of the packing machine turns the disc cam 23 through an angle of 180 degrees so that the movable cam sections 22b and 22c descend to the lower positions 15b and 15c, respectively. This ensures that, when the cells 6a and 6b arrive at the stations 5b and 5c, the roller followers 21 of their walls 9a, 9b move smoothly from the undersides of the fixed cam sections 22A, 22' to the undersides of the lowered movable cam sections 22B and 22C. Thus, the movable walls 9a and 9b of the cells 6a and 6b do not change their levels upon arrival at the stations 5b and 5c, respectively.

When the cells 6a and 6b respectively enter the stations 5b and 5c, the empty cell 6 enters the station 5a. The top wall 9 of this cell is held at the required level by the fixed section 22A of the cam 22 so that the cell 6 provides room for admission of a layer 111A but not much more, i.e., the articles 11 of the layer 111A which enters the cell 6 at the station 5a are held without any play and can be transported to the station 5b during the next-following movement of the conveyor 4 in the direction indicated by the arrows A.

As soon as the conveyor 4 comes to a standstill, i.e., as soon as the cell 6 arrives at the station 5a and the cells 6a, 6b respectively arrive at the stations 5b and 5c, the prime mover of the packing machine again turns the disc cam 23 through 180 degrees so that the cam sections 22b and 22c are lifted back to the levels or positions 20b and 20c and the respective walls 9a, 9b provide room for introduction of layers 111B, 111C, respectively. The same procedure is repeated again and again so that successive cells are filled with layers of articles 11 and successive blocks 111 are expelled from the respective cells at the station which follows the station 5c. The ejecting station for the blocks 111 may but need not immediately follow the station 5c.

As a freshly emptied cell advances from the block-expelling station back toward the station 5a (along the lower reach of the conveyor 4), the corresponding springs 17 maintain the respective top wall 9 at a maximum distance from the corresponding bottom wall. The wall 9 is thereupon gradually lowered by the right-hand portion of the fixed cam section 22A of FIG. 1 so that the distance between the walls 7 and 9 of a cell which has arrived at the station 5a again equals or only negligibly exceeds the diameter of an article 11. Thus, the cell can receive a layer 111A without any play or with negligible play.

An advantage of the springs 17 is that they invariably ensure proper engagement between the followers 21 of the movable walls 9 and the fixed and movable sections of the cam 22. The springs 17 tend to increase the volumes of the respective cells 6 by urging the movable walls 9 away from the respective second walls 7, and the sections of the cam 22 can move the movable walls 9 nearer to the respective second walls 7 when the need for a reduction of the volumes of the respective cells arises. The lugs 14 ensure that the springs 17 cannot move the walls 9 beyond the maximum-permissible volume positions of such walls, i.e., beyond those positions in which the articles 11 of a fully accumulated array 111 in a cell 6 would be free to change their positions to thereby adversely affect the integrity of the respective array.

An important advantage of the improved apparatus is that the cells 6 invariably prevent any misalignment of the articles 11 which are confined therein, irrespective of whether a cell contains a single layer (111A), two layers (111A, 111B) or a fully assembled array or block (111) of parallel articles 11. This is due to the fact that the cam 22 invariably maintains the movable walls 9 as close to the nearest layer 111A, 111B or 111C as possible without adversely influencing the appearance of the adjacent articles. Thus, it is immaterial whether the conveyor 4 is suddenly started, abruptly arrested, rapidly accelerated or rapidly decelerated because the movable walls 9 invariably hold the confined articles 11 against any movements which would entail the accumulation of unsatisfactory arrays and/or conversion of satisfactory arrays into defective arrays prior to expulsion of such arrays at a location downstream of the last outlet (2c), as considered in the direction of travel of cells 6 along their predetermined path. The volumes of the cells 6 are increased only while the conveyor 4 is at a standstill, i.e., at a time when the articles 11 in the confined layer or layers (111A or 111A and 111B) are incapable of changing their positions, and the cells are filled to capacity when the conveyor is thereupon set in motion to advance the cells to the next-following outlets or beyond the last outlet.

The length of the spaces 10a and 10b is sufficient to ensure that the movable cam sections 22b, 22c can be lowered by the spring 27 before the followers 21 of oncoming movable walls 9 reach the outlets 2b, 2c. This ensures smooth transition of followers 21 from the undersides of the fixed cam sections 22A, 22' to the undersides of the freshly lowered movable cam sections 22b, 22c. The sections 22b, 22c are thereupon lifted as soon as the conveyor 4 comes to a standstill so that the aforementioned pushers can expel layers 111B, 111C from the openings in the lower portions of the respective outlets 2b, 2c.

Another important advantage of the improved apparatus is that it is not more expensive, more complex and more prone to malfunction than heretofore known apparatus. Furthermore, the apparatus is capable of accumulating optimal arrays of cigarettes at the rate which is required in the most recent versions of high-speed cigarette packing machines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for assembling arrays of overlapping layers of parallel cigarettes or analogous rod-shaped articles, comprising a conveyor movable intermittently in a predetermined direction along a predetermined path and including a plurality of equidistant variable-capacity receptacles for arrays, said receptacles having movable walls and each receptacle further having a second wall which is at least substantially parallel to the respective movable wall; a magazine adjacent to a portion of said path and including several outlets each having means for accumulating successive layers of parallel articles and an opening for evacuation of successively accumulated layers, each of said openings being in register with a receptacle during each interval of dwell of the conveyor and the spacing between the openings of said outlets matching the spacing between the receptacles of said conveyor, as considered in said direction; means for transferring the layers from the outlets of said magazine into the registering receptacles during successive intervals of dwell of the conveyor, the width of each of said openings, as considered in said direction, at least approximating the width of layers which are accumulated in the respective outlets; and means for varying the capacity of said receptacles so that each receptacle which registers with an opening provides room only for reception of the respective layer and the receptacles advancing between and beyond said openings are at least substantially filled to capacity, said varying means including means for moving the movable walls of successive receptacles between different positions to thereby vary the volumes of the respective receptacles, said moving means including means for yieldably urging said movable walls at right angles to and away from the respective second walls.

2. The apparatus of claim 1, wherein said outlets are disposed one after the other, as considered in said direction, and further comprising means for expelling arrays from the receptacles downstream of the last outlet, as considered in said direction.

3. Apparatus for assembling arrays of overlapping layers of parallel cigarettes or analogous rod-shaped articles, comprising a conveyor movable intermittently in a predetermined direction along a predetermined path and including a plurality of equidistant variable-capacity receptacles for arrays, said receptacles having movable walls and each receptacle further having a second wall which is at least substantially parallel to the respective movable wall; a magazine adjacent to a portion of said path and including several outlets each having means for accumulating successive layers of parallel articles and an opening for evacuation of successively accumulated layers, each of said openings being in register with a receptacle during each interval of dwell of the conveyor and the spacing between the openings of said outlets matching the spacing between the receptacles of said conveyor, said outlets including a first outlet and a second outlet located downstream of said first outlet, as considered in said direction; means for transferring the layers from the outlets of said magazine into the registering receptacles during successive intervals of dwell of the conveyor, the width of each of said openings, as considered in said direction, at least approximating the width of layers which are accumulated in the respective outlets; and means for varying the capacity of said receptacles so that each receptacle which registers with an opening provides room only for reception of the respective layer and the receptacles advancing between and beyond said openings are at least substantially filled to capacity, said varying means including means for moving the movable walls at right angles to the respective second walls, said moving means including means for maintaining the movable walls of receptacles approaching said first and second outlets in first positions at a first distance from the respective second walls and for moving the movable wall of the receptacle which is in register with the opening of said second outlet to a second position at a greater second distance from the respective second wall during each interval of dwell of said conveyor.

4. The apparatus of claim 3, wherein each of said receptacles further comprises a pair of side walls and said movable walls include portions extending outwardly beyond the respective side walls, each of said receptacles further comprising guide means for said portions of the respective movable walls.

5. The apparatus of claim 3, wherein the distance between the walls of the receptacle in register with the opening of the first outlet at least approximates the thickness of a single layer and the distance between the walls of the receptacle in register with the opening of the second outlet in the second position of the corresponding movable wall at least approximates the combined thickness of two layers.

6. The apparatus of claim 3, wherein the openings of said outlets are disposed at different levels.

7. The apparatus of claim 3, wherein said openings are at least substantially horizontal and said accumulating means includes upright ducts in said outlets.

8. The apparatus of claim 3, wherein at least one of said outlets is arranged to accumulate successive layers each of which contains a first number of parallel articles and at least one other outlet is arranged to accumulate layers each of which contains a different second number of parallel articles.

9. Apparatus for assembling arrays of overlapping layers of parallel cigarettes or analogous rod-shaped articles, comprising a conveyor movable intermittently in a predetermined direction along a predetermined path and including a plurality of equidistant variable-capacity receptacles for arrays, said receptacles having movable walls and each receptacle further having a second wall which is at least substantially parallel to the respective movable wall; a magazine adjacent to a portion of said path and including several outlets each having means for accumulating successive layers of parallel articles and an opening for evacuation of successively accumulated layers, each of said openings being in register with a receptacle during each interval of dwell of the conveyor and the spacing between the openings of said outlets matching the spacing between the receptacles of said conveyor, as considered in said direction; means for transferring the layers from the outlets of said magazine into the registering receptacles during successive intervals of dwell of the conveyor, the width of each of said openings, as considered in said direction, at least approximating the width of layers which are accumulated in the respective outlets; and means for varying the capacity of said receptacles so that each receptacle which registers with an opening provides room only for reception of the respective layer and the receptacles advancing between and beyond said openings are at least substantially filled to capacity, said moving means including means for moving the movable walls of successive receptacles between different positions to thereby vary the volumes of the respective receptacles, said means for moving the movable walls of successive receptacles comprising means for moving the movable walls at right angles to the respective second walls including cam means adjacent to said path, said movable walls including follower means tracking said cam means and said cam means comprising at least one section which is movable transversely of said path.

10. The apparatus of claim 9, wherein said moving means further comprises means for biasing the follower means of said movable walls against said cam means.

11. Apparatus for assembling arrays of overlapping layers of parallel cigarettes or analogous rod-shaped articles, comprising a conveyor movable intermittently in a predetermined direction along a predetermined path and including a plurality of equidistant variable-capacity receptacles for arrays, said receptacles having movable walls and each receptacle further having a second wall which is at least substantially parallel to the respective movable wall; a magazine adjacent to a portion of said path and including several outlets each having means for accumulating successive layers of parallel articles and an opening for evacuation of successively accumulated layers, each of said openings being in register with a receptacle during each interval of dwell of the conveyor and the spacing between the openings of said outlets matching the spacing between the receptacles of said conveyor, as considered in said direction, said outlets including a first outlet and a second outlet spaced apart from and located downstream of said first outlet, as considered in said direction; means for transferring the layers from the outlets of said magazine into the registering receptacles during successive intervals of dwell of the conveyor, the width of each of said openings, as considered in said direction, at least approximating the width of layers which are accumulated in the respective outlets; and means for varying the capacity of said receptacles so that each receptacle which registers with an opening provides room only for reception of the respective layer and the receptacles advancing between and beyond said openings are at least substantially filled to capacity, said moving means including means for moving the movable walls of successive receptacles between different positions to thereby vary the volumes of the respective receptacles, said means for moving the movable walls of successive receptacles comprising means for moving the movable walls at right angles to the respective second walls including cam means adjacent to said path, said movable walls including follower means tracking said cam means and said cam means including a fixed section extending along said first outlet and between said first and second outlets, a movable section adjacent to said second outlet, and means for reciprocating said movable section between a position of alignment with said fixed section and a second position in which the distance between the movable wall of the receptacle in register with the opening of said second outlet and the respective second wall is greater than that between the walls of the receptacle which is in register with the opening of the first outlet.

12. The apparatus of claim 11, wherein said reciprocating means comprises additional cam means.

13. The appartaus of claim 11, wherein said outlets further include a third outlet located downstream of said second outlet, as considered in said direction, said cam means further including a second fixed section disposed between the second and third outlets to maintain the movable walls of successive receptacles at a distance from the respective second walls which corresponds to said greater distance, a second movable section at said third outlet, and means for reciprocating the second movable section between a position of alignment with the second fixed section and a second position in which the distance between a movable wall adjacent to said second movable section and the respective second wall exceeds said greater distance.

* * * * *